United States Patent [19]

Southwick et al.

[11] 4,448,253

[45] May 15, 1984

[54] MODERATED BOROHYDRIDE-INDUCED RESERVOIR DEWATERING

[75] Inventors: Jeffrey G. Southwick; Lee N. Morgenthaler, both of Houston, Tex.

[73] Assignee: Shell Oil Company, Houston, Tex.

[21] Appl. No.: 473,887

[22] Filed: Mar. 10, 1983

[51] Int. Cl.³ .............................................. E21B 43/25
[52] U.S. Cl. .................................................. 166/300
[58] Field of Search ................. 166/300, 305 R, 307, 166/311, 312, 270, 371, 279; 252/8.55 R, 8.55 B, 8.55 D

[56] References Cited

U.S. PATENT DOCUMENTS

| | | | |
|---|---|---|---|
| 2,748,867 | 6/1956 | Lissant | 166/309 |
| 2,872,982 | 2/1959 | Wade | 166/300 |
| 2,889,884 | 6/1959 | Henderson et al. | 166/300 X |
| 3,279,541 | 10/1966 | Knox et al. | 166/300 |

*Primary Examiner*—Stephen J. Novosad
*Assistant Examiner*—Bruce M. Kisliuk

[57] ABSTRACT

A productivity-impairing water-block is removed from a subterranean reservoir by injecting an aqueous alkaline solution containing both an alkali metal borohydride and an acid-yielding reactant which is relatively slowly reactive.

7 Claims, No Drawings

MODERATED BOROHYDRIDE-INDUCED RESERVOIR DEWATERING

BACKGROUND OF THE INVENTION

The present invention relates to treating subterranean oil or gas groducing reservoirs to remove water from near well locations in which it can block or impede the flow of oil or gas into the well.

Pertinent prior disclosures include the following: U.S. Pat. No. 2,461,661, describes methods for preparing alkali metal borohydrides, and their capability of reacting with water to yield hydrogen, heat and alkaline inorganic salts. U.S. Pat. No. 2,872,982 describes treating a well by flowing an aqueous borohydride solution through a well conduit to or near a subterranean reservoir, flowing oil into the conduit to increase the hydrostatic pressure, flowing acid into the conduit to react with some of the borohydride and yield hydrogen that becomes confined within the conduit and displaces the borohydride solution into the reservoir, injecting aqueous acid into the reservoir to react with the borohydride in order to generate hydrogen and heat to loosen pore-plugging materials, and then pumping or bailing fluid out of the well to initiate production from the reservoir. U.S. Pat. No. 2,889,884 describes a well treating process for increasing the permeability of a subterranean reservoir by fracturing the reservoir and removing any water which is blocking the flow of oil to the well. It utilizes a non-aqueous solvent solution of a water-reactive metal hydride such as lithium aluminium hydride or an alkali metal borohydride which is flowed into contact with the water in the reservoir to initiate a violent reaction and cause "extensive" fracturing of the rocks while generating enough gas to provide a high velocity gas-discharge which will "sweep" any unreacted water from the reservoir into the borehole. U.S. Pat. No. 3,279,541 describes a process for removing flow-blocking paraffinic or asphaltic residues from well conduits and/or reservoir rocks by contacting them with a light paraffin solvent mixed with both a chemical solution which evolves heat on contact with water and an emulsifying surfactant, where the heat-evolving chemical solutions can be a solution of alkali metal borohydride.

SUMMARY OF THE INVENTION

The present invention relates to a well treating process for removing water from a subterranean reservoir without fracturing the reservoir or necessarily disturbing any fluid-displaceable particles within the well or reservoir. An alkali metal borohydride is dissolved in an aqueous alkaline solution which has a pH of at least about 10 and contains a dissolved compound which reacts relatively slowly with water, at the reservoir temperature, to yield an acid capable of lowering the pH of the borohydride-containing solution. The borohydride-containing solution is flowed into the reservoir at a rate correlated with the composition of the solution so that a significant volume of solution in which a significant proportion of the borohydride is unreacted, is flowed into the reservoir. After at least substantially all of the borohydride has reacted within the reservoir, fluid is produced from the reservoir.

The extent to which water is removed from the reservoir can be increased by using, as the acid-yielding compound contained within the borohydride-containing solution, a water-reactive ester or halide of a water-soluble organic acid or salt.

SUITABLE MATERIAL AND PROCEDURES

The present invention is particularly valuable for use in gas reservoirs having permeabilities which are suitable for gas production but which contain (in a near well zone such as less than about 10 feet from a production well) enough aqueous liquid to impede the flow of the gas into the well. The present invention is especially well suited for use in such water-blocked gas-producing reservoirs in which sand grains or other unconfined particles within the well or reservoir tend to be easily disrupted and entrained in produced fluid.

The present invention is also especially well suited for removing water from within or around a well within which or around which a mass of relatively small particles (such as particles in the sand or gravel size range) have been installed to provide a sand or gravel pack in the borehole and/or fracture propping particles in the reservoir.

In contrast to previously proposed treatments for removing production-impeding water-blocks, in the present process, only one fluid need be injected through the well and into the reservoir. The pressure and rate at which that fluid is injected while conducting the present process is preferably kept low enough to avoid any significant disruption of the infow-configuration of any masses of unconsolidated or poorly consolidated particles through which the injected fluid is flowed. Such a rate of inflow is, for example, characterized by being substantially the same during an inflowing and outflowing of the same unreactive fluid in response to inflow and outflow pressure gradients which are substantially equal.

Suitable alkali metal borohydrides for use in this invention include substantially any such compounds or mixtures of such compounds and/or catalytic materials for causing a reaction at a relatively moderate rate, at the reservoir temperature, between the borohydride and water having a near-neutral pH.

Suitable alkaline materials for raising the pH of the borohydride-containing aqueous solution include substantially any alkaline materials which are substantially inert to alkali metal borohydrides and are sufficiently soluble in water. Examples of suitable alkaline materials include alkali metal hydroxides such as sodium hydroxide and alkali metal salts of weak acids such as carbonic, boric and the like inorganic acids and/or water soluble fatty acids.

Suitable water-reactive compounds for use in subsequently reducing the pH of the borohydride-containing solutions of the present invention can comprise substantially any which react relatively slowly at the reservoir temperature to yield water-soluble organic or inorganic acids and by-products which are soluble in water. Examples of suitable reactants include esters of alcohols containing about 1 to 5 carbon atoms with fatty acids containing about 1 to 5 carbon atoms, water-soluble salts of water-reactive acids such as an alkali metal salt of chloroacetic acid and the like.

The concentration of the reactive components in the presently described borohydride-containing solutions should be correlated with the physical and chemical properties of the reservoir. A factor of such a correlation is the rate at which the solution can be flowed through a well conduit and into the reservoir. The maximum rate is limited by the effective permeability of the reservoir and/or openings between the well and the reservoir. The rate used is preferably selected to avoid disturbing the inflow configuration of any masses of unconfined particles through which the injected fluid must flow. The temperature in the well and reservoir is essentially that determined by the depth of the reservoir and the ambient temperature gradient. In general, where the temperature is relatively high, the rate of the reaction of the borohydride with the water in the borohydride solution and/or reservoir can be kept slow by using a borohydride-containing solution having a relatively high pH and/or a relatively low concentration of borohydride.

In a given situation, the rate of the reaction can be adjusted by steps such as the following. The pH of the borohydride-containing solution can be increased by utilizing a strongly alkaline material such as an alkali metal hydroxide and/or using a relatively high concentration of alkaline material. The rate of the reaction of the acid-yielding reagent (and thus, ultimately, the rate of the reaction of the borohydride with water) can be kept low by utilizing a relatively slowly-reacting material and/or a proportion of acid-yielding material which is barely sufficient to neutralize the pH of the borohydride-containing solution, and the like adjustments of the composition of the borohydride-containing solution.

The volume and borohydride concentration of the borohydride-containing solution which is injected into the reservoir is preferably adjusted so that the amount of unreacted borohydride which enters the reservoir is at least substantially sufficient to convert substantially all of the water within the near well zone of the reservoir to alkaline inorganic salts and hydrogen. The composition and concentration of acid-yielding reactive compound in the borohydride-containing solution is preferably adjusted to initiate a relatively rapid but moderate rate of reaction substantially as soon as the injected solution has entered the near-well portion of the reservoir.

What is claimed is:

1. A well treating process for improving the productivity of an oil or gas-productive reservoir by removing water from the reservoir without fracturing the reservoir comprising:

dissolving an alkali metal borohydride in an aqueous alkaline solution which has a pH of at least about 10 and contains at least one dissolved compound which reacts relatively slowly with water at the reservoir temperature to yield an acid capable of lowering the pH of the borohydride-containing solution;

flowing the borohydride-containing solution into the reservoir at a rate which is correlated with the composition of the solution so that a significant volume of the solution in which a significant portion of the borohydride has not yet reacted is displaced into the reservoir; and after substantially all of the borohydride has reacted, initiating the production of fluid from the well.

2. The process of claim 1 in which the reservoir being treated is a gas-producing reservoir in which the production rate is reduced by the presence of water in a near-well portion of the reservoir.

3. The process of claim 1 in which the borohydride is sodium borohydride.

4. The process of claim 3 in which the acid-yielding compound is methyl formate.

5. The process of claim 3 in which the acid-yielding compound is sodium chloroacetate.

6. The process of claim 1 in which the rate at which the borohydride-containing fluid is injected into the well is low enough to avoid significantly disrupting the inflow configuration of unconfined masses of solids encountered by the fluid.

7. The process of claim 6 in which the reservoir being treated is a poorly consolidated gas reservoir.

* * * * *